US 6,611,074 B2

(12) United States Patent
Bartolotti

(10) Patent No.: US 6,611,074 B2
(45) Date of Patent: Aug. 26, 2003

(54) ARRAY OF ELECTROMAGNETIC MOTORS FOR MOVING A TOOL-CARRYING SLEEVE

(75) Inventor: Michael Bartolotti, Bellinzona (CH)

(73) Assignee: Ballado Investments Inc., Panama (PA)

( * ) Notice: Subject to any disclaimer, the term of this patent is extended or adjusted under 35 U.S.C. 154(b) by 0 days.

(21) Appl. No.: 09/886,137

(22) Filed: Jun. 22, 2001

(65) Prior Publication Data

US 2002/0149279 A1 Oct. 17, 2002

(30) Foreign Application Priority Data

Apr. 12, 2001 (CH) ............................................... 688/01

(51) Int. Cl.[7] .............................................. H02K 16/00
(52) U.S. Cl. .................... 310/114; 310/12; 310/266; 310/50; 310/112; 310/67 R; 310/13; 310/14
(58) Field of Search ............................... 310/12, 14, 13, 310/112, 114, 154, 156, 47, 50, 266, 67 R

(56) References Cited

U.S. PATENT DOCUMENTS

| | | | | |
|---|---|---|---|---|
| 4,234,831 A | * | 11/1980 | Kemmer et al. ............... 310/12 |
| 4,730,789 A | * | 3/1988 | Geiger ........................ 241/171 |
| 4,869,626 A | * | 9/1989 | Kosmowski ................. 310/12 |
| 4,922,603 A | * | 5/1990 | Kosmowski ................. 206/379 |
| 5,982,053 A | * | 11/1999 | Chitayat ........................ 310/12 |
| 6,137,195 A | * | 10/2000 | Chitayat ........................ 310/12 |
| 6,215,206 B1 | * | 4/2001 | Chitayat ........................ 310/12 |
| 6,227,777 B1 | * | 5/2001 | Kosmowski ................. 408/124 |
| 2002/0149279 A1 | | 10/2002 | Bartolotti | |

FOREIGN PATENT DOCUMENTS

| | | |
|---|---|---|
| EP | 1 036 619 A1 | 9/2000 |
| JP | 5-284686 | 10/1993 |
| JP | 7-107705 | 4/1995 |

* cited by examiner

*Primary Examiner*—Nestor Ramirez
*Assistant Examiner*—J. Aguirrechea
(74) *Attorney, Agent, or Firm*—Young & Thompson

(57) ABSTRACT

An array (10) contains a rotary electromagnetic motor (11) and/or a linear electromagnetic motor (12) that is (are) attached to a tool-carrying sleeve (19) of a machine tool that carries out high-speed working in order to draw off shavings, in which magnets (13, 14i) of the motor(s) are integral with the tool-carrying sleeve (19) itself. In the array (10) magnets (13, 14i) are made integral with the tool-carrying sleeve (19) by a hollow tube (15) that is attached coaxially to the tube on an inside wall (15g) where the magnets are attached coaxially. The array (10) also contains a hollow shaft (16) that is fixed in place while the array (10) is in operation and is inserted coaxially into the hollow tube (15). A number of stator induction coils (17) that interact with the magnets (13, 14i) are arranged on an outer surface of the hollow shaft, and coaxially with respect to the hollow tube.

7 Claims, 5 Drawing Sheets

ARRAY OF ELECTROMAGNETIC MOTORS FOR MOVING A TOOL-CARRYING SLEEVE

BACKGROUND OF THE INVENTION

This invention pertains to the technology sector of machine tools that perform very high-speed (at sometimes even more than 200,000 rpm) drilling, milling, grinding, etc. operations.

One of the more specific applications for such machine tools is that of working support plates for printed circuits.

More particularly, this invention pertains to an array of electromagnetic motors that are prearranged in a machine in order to ensure the rotational and/or axial movement of a tool-carrying sleeve. In his European patent application number 99 204 130.1, the same applicant previously described an innovative array in which the movable magnets of a linear motor are attached to the outside of the tool-carrying sleeve, while the stator coils are attached to the inner surface of a hollow member that is coaxially external with respect to the tool-carrying sleeve itself.

While offering valid advantages, this solution, which moreover is implemented in various ways in other examples according to the state of the art, has the drawback that, owing to the above-mentioned high speed of rotation, the movable magnets are subject to stress from elevated centrifugal forces that can, in turn, cause some or all of the magnets to be detached from the substrate to which they are attached. Even the detachment of individual sintered particles can impair operations since said particles remain stuck in the air gap that is present between the movable magnets and the fixed stator coils, thereby exerting a dangerous and damaging "grinding" action on the component parts.

SUMMARY OF THE INVENTION

Because the technology of this field of endeavor is focused on achieving ever higher working speeds, the inventor of this invention considered it necessary to look for a solution that would avoid the risk of drawbacks similar to those described above. To this end, he has thought up a new way of arranging the various component parts of an array that is composed of the electromagnetic motors. According to the invention, in fact, as will be further described below, the magnets are attached coaxially to the inside of a robust hollow tube that is integral with the tool-carrying sleeve itself, while the coils are attached to the outside of a shaft that is inserted coaxially into said hollow sleeve, whereby said shaft is held firmly in place during operation in order to perform its stator function.

This solution ensures that the magnets are pushed by centrifugal force against the inner surface of said hollow tube, whereby said centrifugal force exerts a supporting and opposing action that prevents the magnets from moving in the radial direction and prevents individual particles thereof from becoming detached from the magnets in the radial direction.

BRIEF DESCRIPTION OF THE DRAWINGS

A more detailed description will now be given of some embodiments of an array according to the invention, whereby reference will also be made to the attached drawings where.

DETAILED DESCRIPTION OF THE PREFERRED EMBODIMENTS

Figure 1:
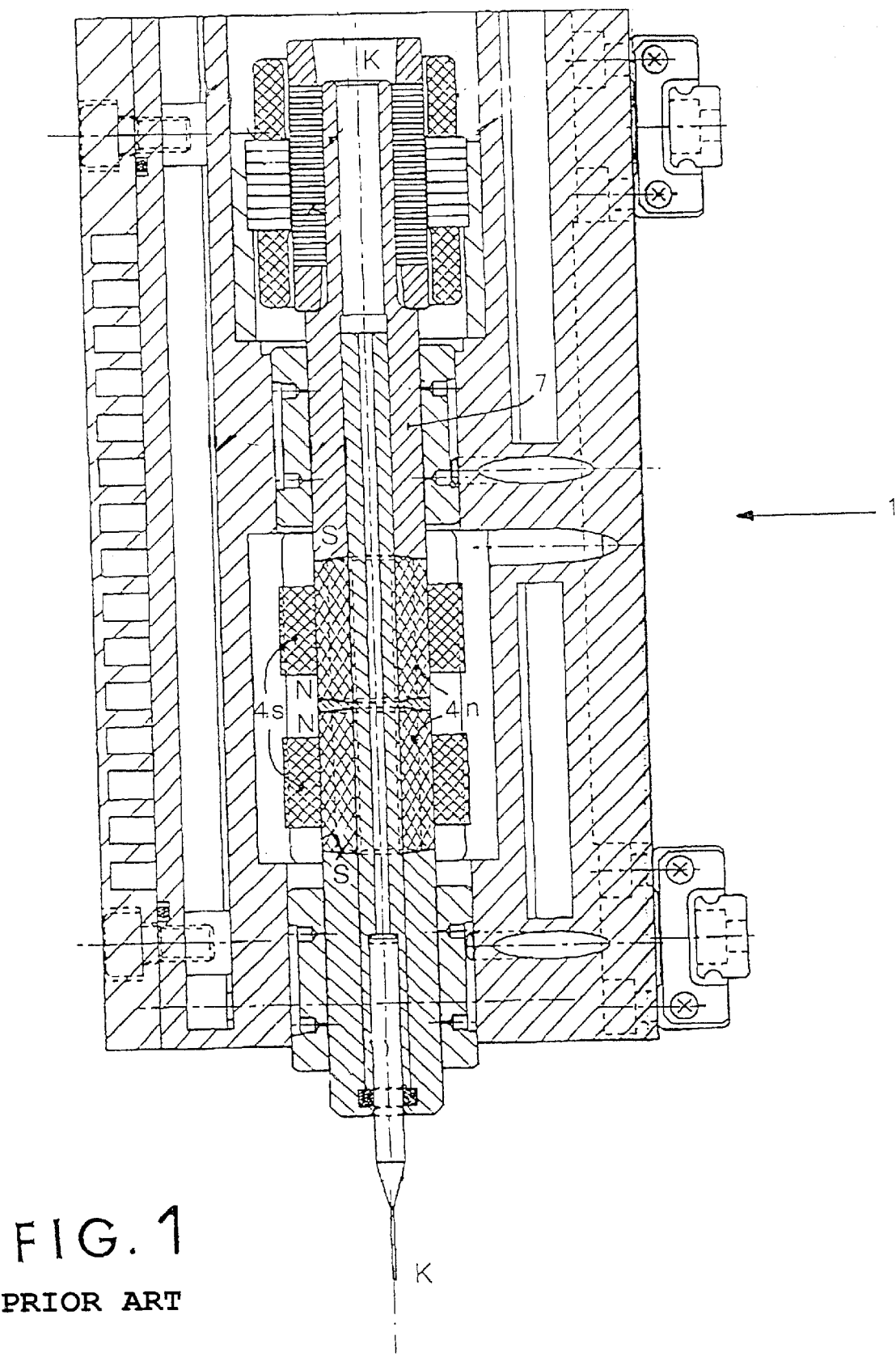
FIG. 1 shows a longitudinal section of a portion of a machine tool that contains electromagnetic motors designed according to the state of the art.

If FIG. 1 is first examined, we see a state-of-the-art example of a tool-carrying spindle 1 into which is inserted a hollow tube 7 to which are attached magnets 4n of a linear electromagnetic motor, while corresponding induction coils 4s are installed coaxially on the outside with respect to the magnets. There thus exists the above-described risk of some or all of the magnets becoming detached under the action of centrifugal force.

Figure 2:
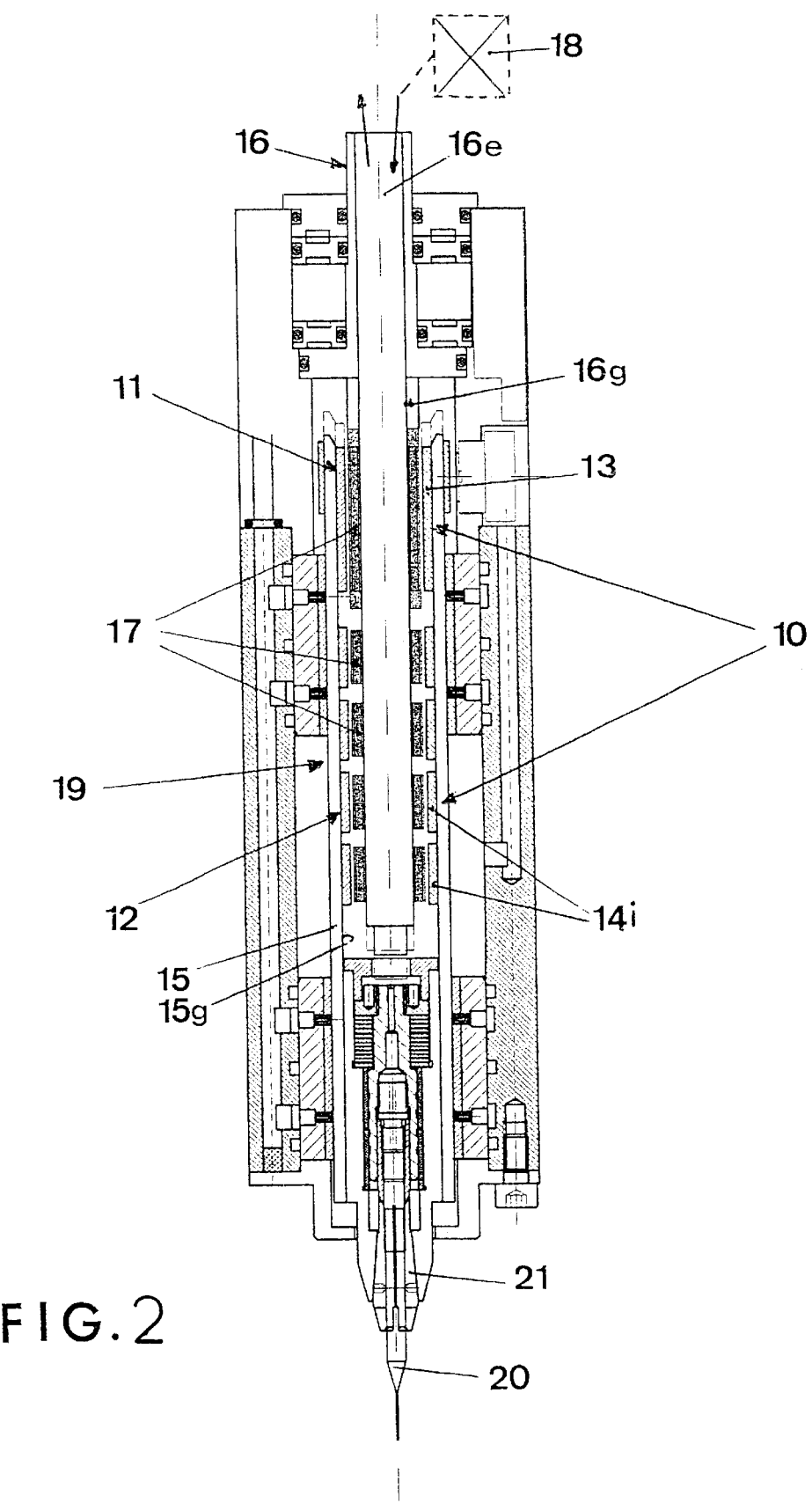
FIG. 2 shows a longitudinal section of a portion of a machine tool that contains a tool-carrying sleeve in which there is an array according to the invention that contains a linear motor and a rotary motor.

If we then look at FIG. 2, which shows how, in an array 10 according to the invention, a tool-carrying sleeve 19 that is equipped with a tool 20 is attached to a hollow coaxial tube 15, to inner surface 15g of which are attached magnets 13 of a rotary electromagnetic motor 11, as well as magnets 14i of a linear electromagnetic motor 12.

Stator coils 17 are in turn attached to outer surface 16g of a hollow shaft 16 that is coaxially inside with respect to hollow tube 15, whereby said shaft is held firmly in place while array 10, which contains said two motors 11, 12, is in operation.

It is clear that the centrifugal forces acting on magnets 13, 14i are borne by said hollow tube 15, while the magnets themselves are stressed by said forces only in terms of compression. Designing said tube 15 with a structure that is robust enough to resist deformation ensures the achievement of the desired goal of not exposing the magnets to tractive stresses that can detach some or all of them from the area where they are attached (integrally by sizing them appropriately).

In cavity 16e of said hollow shaft 16, it is advantageous to run a coolant by means of a cooling system 18, indicated only in schematic form in the figure, so as to draw off heat that could damage the resins in which coils 17 are embedded or could impair the residual-induction characteristics of magnets 13, 14i.

Figure 3:
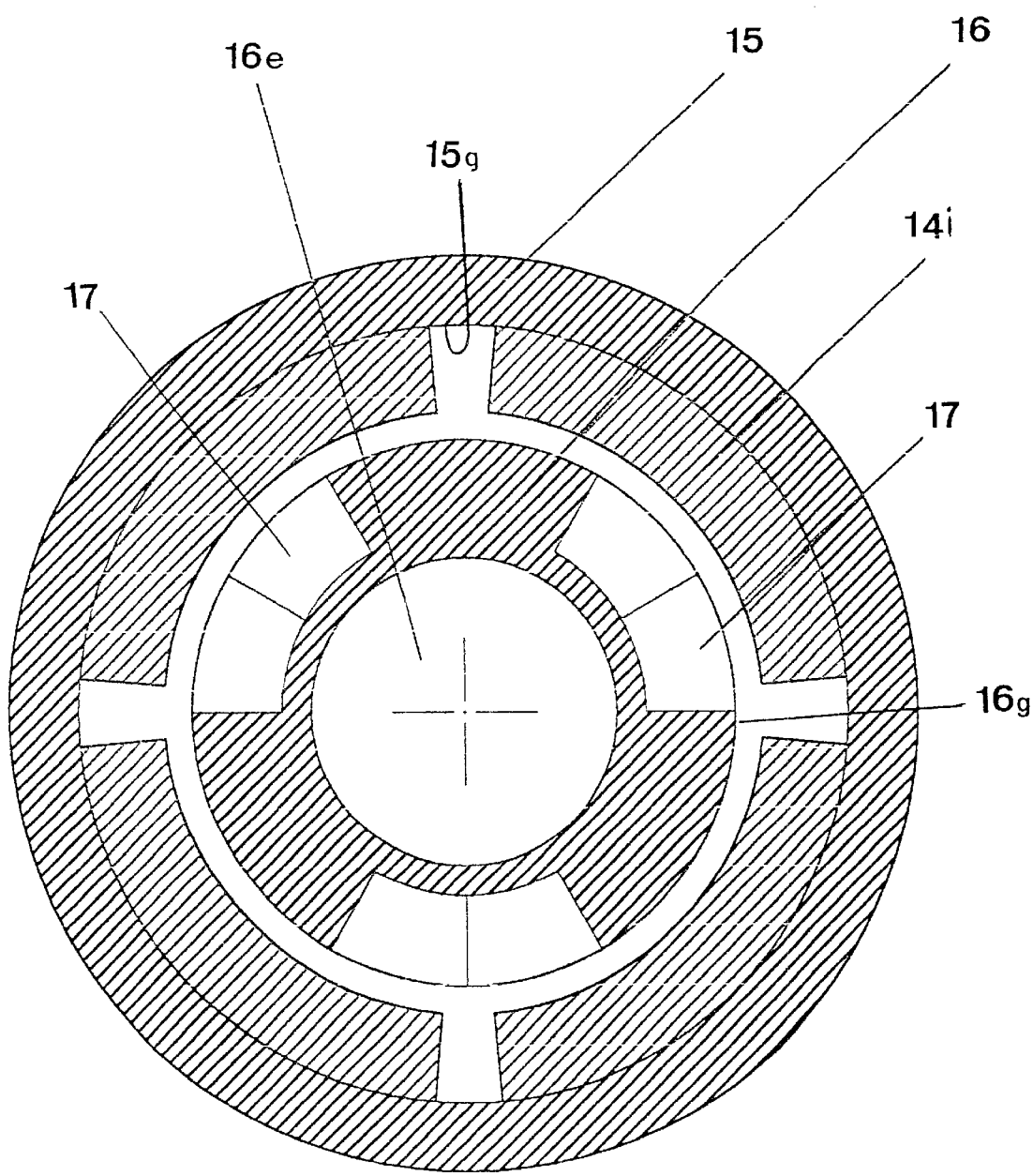
FIG. 3 shows an enlarged cross-section of the most important parts of the array of FIG. 2, corresponding to the rotary motor.

FIG. 3 more clearly shows how the basic parts of system 10 of the invention are arranged. As we see, fixed magnets 13, 14i are attached to inner surface 15g of said hollow tube 15, while stator coils 17 are attached to the outside of a hollow shaft 16, which is internally coaxial. In the case depicted in this figure, said coils 17 are advantageously mounted under outer surface 16g of hollow shaft 16, which on the inside has cavity 16e, the purposes of which were described above.

Figure 4:
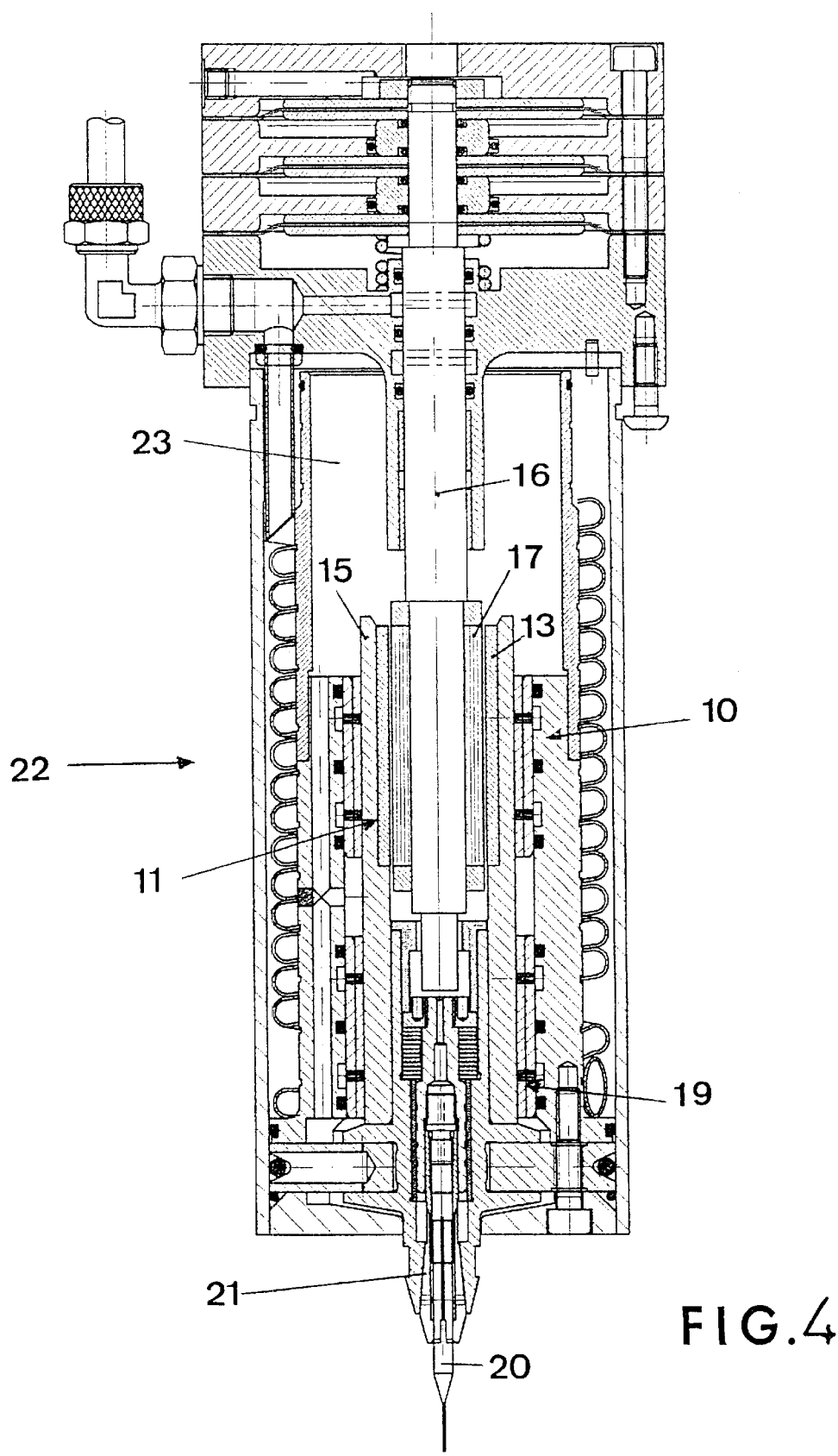
FIG. 4 shows the longitudinal section of a portion of a machine tool that contains a tool-carrying sleeve in which the array according to the invention contains only a rotary motor.

FIG. 4 illustrates in turn an example where array 10 of the invention is attached to a spindle 22 of the known type that is also equipped with an external cooling system. The description of array 10 given up to this point still applies, except for the fact that, in this case, system 10 includes only a rotary electromagnetic motor 11, which is also equipped with magnets 13 that are attached to the inside of a hollow tube 15 and with coils 17 that are attached, as already described above, to the outside of a fixed coaxial hollow shaft 16.

It will be pointed out that, by using the above-described array of the invention on known tool-carrying spindle 22 in question, it is possible to have a free space 23 inside of the spindle itself which, for some types of direct-current drive of rotary motor 11, can house miniaturized electronic parts to drive and control rotary motor 11.

Figure 5:
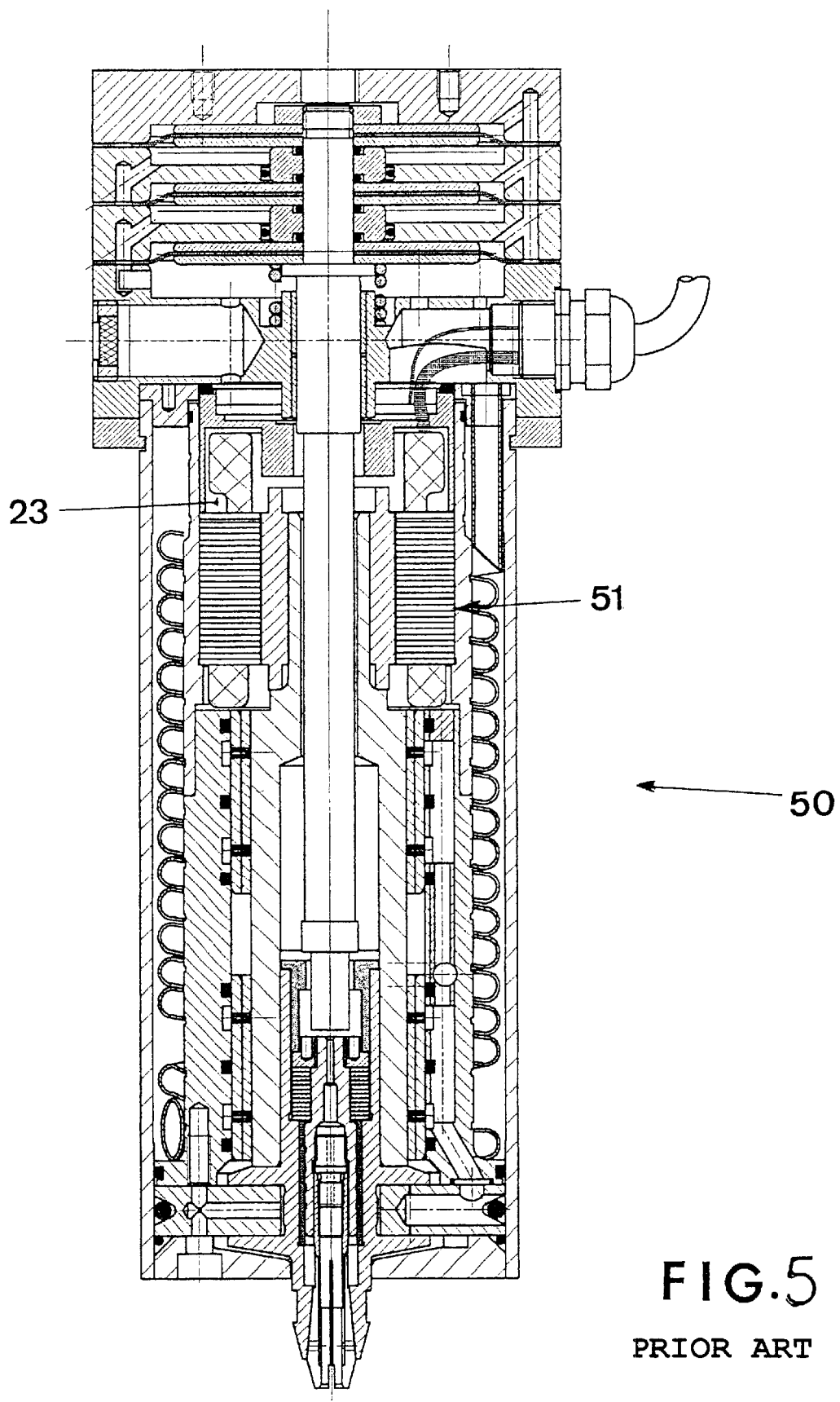
FIG. 5 shows the longitudinal section of a tool-carrying spindle, designed according to the state of the art, which has only a rotary motor.

This was not possible, however, in the tool-carrying spindles designed according to the state of the art, an example 50 of which is shown in FIG. 5, where said space 23 is occupied by a rotary electromagnetic motor 51 of the conventional type.

In all cases where tool-carrying sleeve 19 ends in automatic locking gripper 21 of the known type, the inventor calls for attaching said hollow shaft 16, which, as mentioned, is held securely in place during the working cycle, to known systems or devices which, with tool 20 closed, can make said tool extend reversibly by a preset amount of travel that is able to cause said locking gripper 21 to progress by a preset value until it bumps up against a stop which, by known methods, causes the gripper to open and tool 20 to be released.

What is claimed is:

1. A high-speed spindle, comprising:

a tool-carrying sleeve for a machine tool that operates at high-speed to draw off shavings;

a rotary electromagnetic motor connected to said tool-carrying sleeve and having a plurality of magnets, said tool carrying sleeve including a rotatable hollow tube having an inner wall, said plural magnets being coaxially connected to said inner wall;

a stationary hollow shaft inside said hollow tube and coaxial with said hollow tube, said hollow shaft defining a cavity; and a plurality of stator induction coils connected to said hollow shaft, said plural induction coils facing said plural magnets and being coaxial therewith.

2. Spindle according to claim 1, wherein said hollow shaft is equipped with means that are able to cause it to reversibly carry out travel that is axial with respect to the axial hollow tube, whereby said travel is able to cause the tool and parts that are integral with it to make a preset amount of progress while the spindle is not in operation.

3. The spindle according to claim 1, further comprising a cooling system that circulates a coolant inside said cavity.

4. The spindle according to claim 1, further comprising a linear electromagnetic motor connected to said tool-carrying sleeve and coaxial with said rotary electromagnetic motor.

5. The spindle according to claim 1, wherein said plural stator induction coils are integral with said hollow shaft so that an outer wall of said plural stator induction coils and an outer wall of said hollow shaft are a same radial distance from an axial center of said hollow shaft.

6. The spindle according to claim 1, wherein said plural stator induction coils are connected to an outer surface of said hollow shaft.

7. The spindle according to claim 1, wherein said cavity extends over an entirety of said hollow shaft without any elements of said spindle inside said hollow shaft.

* * * * *